Patented May 3, 1927.

1,627,101

UNITED STATES PATENT OFFICE.

JOSEPH MARTELLI, OF VINELAND, NEW JERSEY.

COMPOSITION FOR TOY TORPEDO CASINGS.

No Drawing. Application filed December 23, 1924. Serial No. 757,610.

My invention relates to a composition for casings for toy torpedoes.

The usual method of making a torpedo casing is by winding, twisting, pressing or otherwise working a paper strip, with or without an adhesive coating thereon, into the desired shape of the torpedo casing. This method involves hand-work, is slow, sticky and tedious, and causes a large waste of paper which increases the cost of production.

All torpedo casings, as far as I am aware, are of such construction that in order to have a completely filled finished torpedo they must be filled completely with the explosive charge before they are capped and sealed. A large quantity of explosive charge is wasted due to spilling caused by handling these filled casings before they are capped and sealed.

The objects of my invention are to provide a torpedo casing which may be easily filled, handled and sealed without spilling the explosive charge; which will avoid the use of paper and which will be of practically uniform strength.

These objects, and other advantageous ends I attain in the manner now to be described.

The casing may be molded into any desired shape from a composition made from saw dust, rosin and corn starch preferably in the following proportions:

| | Parts. |
|---|---|
| Saw dust | 4 |
| Rosin | 2 |
| Corn starch | 1 |

Sufficient water is added to moisten the ingredients and cause them to adhere to each other.

This composition, after being thoroughly mixed, is easily handled and worked into the desired shape of a torpedo casing by a suitable mold. Best results are obtained by placing the mixture in a mold heated to about 212° F. under a pressure of about 400 lbs. per square inch for 3 to 5 minutes. The molded casing is then removed from the mold to cool and harden.

The saw dust acts as a filler, the rosin as a binder and the starch as an absorbent for the moisture.

A casing made from this mixture is of practically uniform strength and may be made with comparatively thick walls of such strength as to produce a loud noise when the torpedo is exploded.

Having thus described my invention, what I claim as new and desire to secure by Letters Patent is:—

1. A composition for the construction of toy torpedo casings consisting of a mixture of 4 parts of saw dust, 1 part of starch and 2 parts of rosin.

2. As a new article of manufacture, a toy torpedo casing molded under heat and pressure from a composition consisting of 4 parts of saw dust, 1 part of starch and 2 parts of rosin.

In testimony whereof I have signed my name to this specification.

JOSEPH MARTELLI.